United States Patent [19]

Schön

[11] Patent Number: 4,881,421
[45] Date of Patent: Nov. 21, 1989

[54] DRIVE WITH OVERLOAD SAFETY COUPLING

[75] Inventor: Stefan Schön, Düdingen, Switzerland

[73] Assignee: Elpatronic AG, Switzerland

[21] Appl. No.: 183,737

[22] PCT Filed: Sep. 9, 1987

[86] PCT No.: PCT/EP87/00512
§ 371 Date: Mar. 22, 1988
§ 102(e) Date: Mar. 22, 1988

[87] PCT Pub. No.: WO88/02079
PCT Pub. Date: Mar. 24, 1988

[30] Foreign Application Priority Data

Sep. 13, 1986 [DE] Fed. Rep. of Germany ....... 3631215

[51] Int. Cl.[4] ...................... F16H 35/10; F16H 27/04
[52] U.S. Cl. .................. 74/412 TA; 74/426; 192/56 R; 192/56 L; 192/150; 464/38
[58] Field of Search .................. 74/412 TA, 426, 416; 192/56 R, 56 L, 150; 464/37, 38

[56] References Cited

U.S. PATENT DOCUMENTS

| | | | |
|---|---|---|---|
| 2,712,246 | 7/1955 | Zakrajsek | 74/426 |
| 3,817,116 | 6/1974 | Georgieff | 74/426 |
| 3,898,816 | 8/1975 | Lindahl et al. | 64/29 |
| 4,044,872 | 8/1977 | Punsmann et al. | 192/56 R |

FOREIGN PATENT DOCUMENTS

| | | | |
|---|---|---|---|
| 436714 | 11/1926 | Fed. Rep. of Germany | 74/416 |
| 2433995 | 2/1975 | Fed. Rep. of Germany | . |
| 3241083 | 5/1984 | Fed. Rep. of Germany | 74/416 |
| 1168389 | 10/1969 | United Kingdom | 192/56 L |

OTHER PUBLICATIONS

Machine Design, Band 37, Jul. 1965, "Notched Latch Provides Torque Fuse", p. 128.

Primary Examiner—Leslie A. Braun
Assistant Examiner—Scott Anchell

[57] ABSTRACT

A mechanical drive, especially a stepping drive which can be driven by a drive shaft (14) for the conversion of a rotary drive movement to an output rotary movement which follows a given law of movement and can be taken from an output shaft (16), is provided with a spring-biased safety coupling (22; 26; 28) which disengages upon overload. The spring (30) biasing the safety coupling is supported on a biasing element which is mounted in the drive casing (12) for movement by a given amount in the direction of an increase or reduction of the spring bias, and which is part of the output of a cam drive whose cam is coupled co-rotationally with the drive shaft or output shaft (14 and 16, respectively).

9 Claims, 3 Drawing Sheets

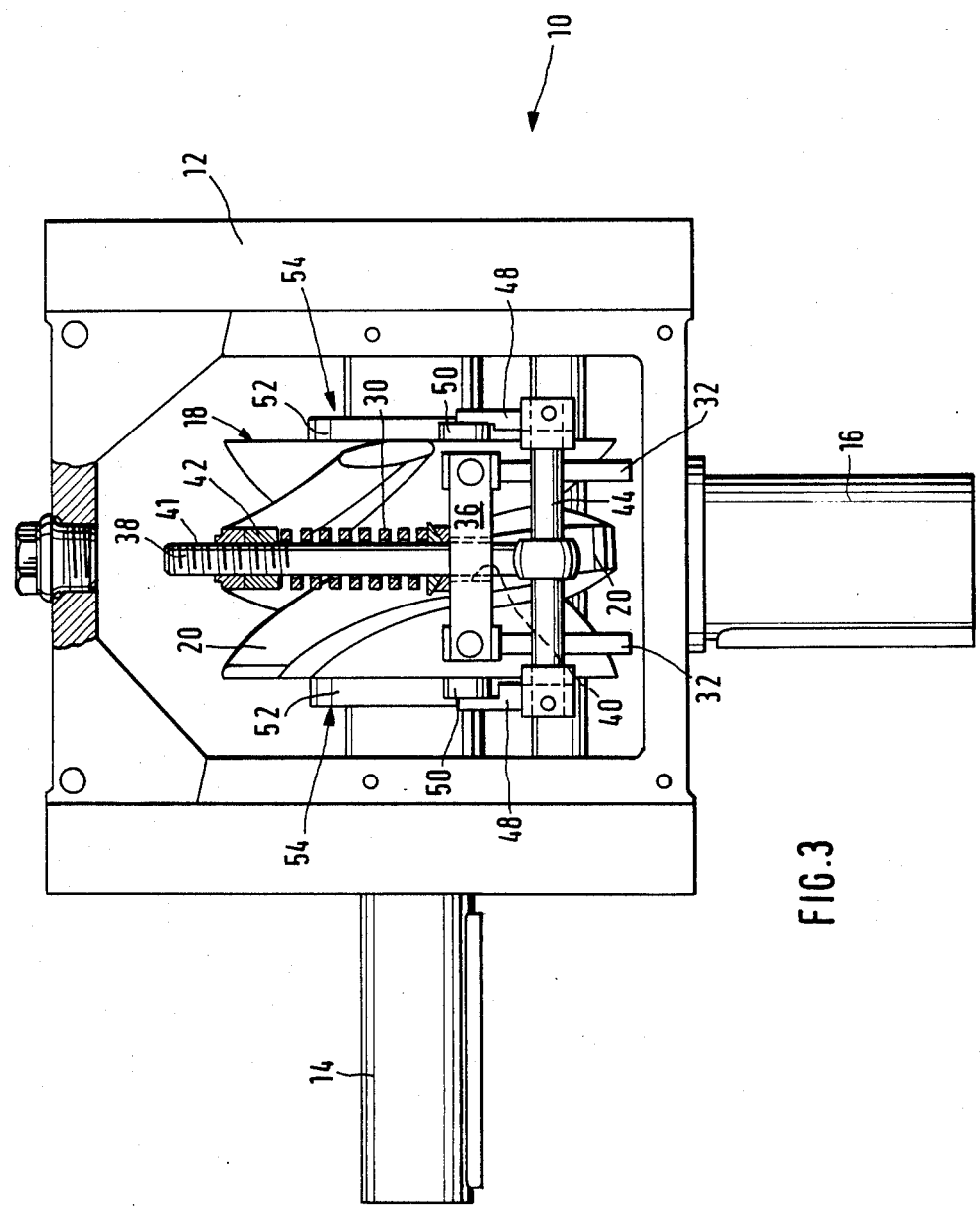

DRIVE WITH OVERLOAD SAFETY COUPLING

The invention relates to a mechanical drive, especially stepping drives rotatable through a drive shaft for converting a rotary ddrive movement to an output rotary movement which follows a given law of motion and can be taken from an output shaft, in which a spring-biased safety coupling is disposed which is disengaged in the event of an overload.

The protection of rotary drives by safety couplings which disengage if a given maximum torque is exceeded is known. Safety couplings are also used to secure drives against damage by overload, and a great number of types of design have been developed. Such safety couplings can have, for example, coupling elements compressed into positive or frictional engagement by a biasing spring; one of them is coupled for co-rotation with the driving shaft and the other for co-rotation with the driven or output shaft of the rotary drive that is to be protected. The amount of the disengagement torque is determined by the bias of thespring forcing the coupling elements into engagement, i.e., it is substantially constant. The disengagement torque of the safety coupling is accordingly adjusted in such protected drives so as to be less than the designed maximum allowable torque calculated on the basis of strength. This is to assure that the drive can never be overloaded. But at the same time no consideration is given to the fact that, especially in the case of stepping drives with complex mechanical drives connected to their output, it is not the maximum load bearing capacity of the drive itself but the stress on the components of the following mechanism that can be critical, the allowable stress capacity depending on the position of the connected moving parts. In such applications the engagement torque of the safety coupling must be adjusted to the lowes torque allowed in the driven system, although the low disengagement torque determined in this manner is necessary only in quite specific conditions of operation. In certain applications it would also be desirable for the disengagement torque to be variable according to the output torque.

It is the object of the invention to create a drive, and especially a stepping drive, with a safety coupling whose disengagement torque automatically adapts itself to given operational requirements.

Setting out from a drive of the kind described above, this objec is achieved according to the invention by the fact that the spring biasing the safety clutch is supported on a biasing element held in the drive casing for movement toward an increase or reduction of the spring bias. The biasing element is part of the secondary part of a cam drive whose cam is coupled for co-rotation with the drive shaft or output shaft. By varying the shape of the control cam, therefore, the bias of the spring biasing the safety coupling and thus the disengagement torque of the coupling is variable according to the position of the rotor bearing the drive cam, i.e., of the driving or output shaft.

In one embodiment the drive to be protected is a stepping drive with a globoid wheel or cylindrical wheel disposed in the drive casing, on or in whose circumferential surface a drive control cam is provided in the form of crosspieces or grooves which mesh with output drive pins projecting at regular intervals radially from the circumference of a driven wheel, while the driven wheel is disposed on the output shaft mounted in the drive casaing at right angles to and at a distance from the driving shaft. The configuration is preferably such that the safety coupling disposed between the driven wheel and the output shaft has two coupling elements displaceable relative to one another and in positive engagement with one another or disengaged from one another depending on their relative position. One of these coupling elements is coupled co-rotationally with the driven wheel which in turn is journaled on the output shaft, and the other is coupled co-rotationally with the output shaft. One end of the biasing spring is supported directly or indirectly on the coupling element that is displaceable relative to the other coupling element and the coupling elements are urged into engagement. The biasing element thrusting against the other end of the spring is connected to one end of a lever pivotally mounted in the drive casing, which is coupled with a follower tracking the control surface of the cam of the cam drive.

A configuration is desirable in which the drive wheel and the coupling element fastened co-rotationally with it are combined into an integral component which is rotatable but undisplaceable lengthwise on the output shaft, and the associated second coupling element connected co-rotationally to the output shaft is disposed for longitudinal displacement on the output shaft.

In advantageous further development of the invention the configuration can be made such that the lever is a single-arm lever which is journaled in the drive casing at its one end on a shaft running in the area between the drive shaft and the output shaft parallel to the drive shaft, and which extends beyond the drive cam provided on the globoid or cylindrical wheel and connected co-rotationally with the latter or extends beyond the cam of the cam drive, and is provided with the follower in an area opposite the drive cam. The bias of the spring is applied to its free end in the sense that the follower is urged into engagement with the drive cam, and on the shaft on which the lever is journaled in the drive casing a second two-arm lever is journaled whose one arm is supported on the free face of the coupling element mounted for co-rotation but longitudinally displaceably on the output shaft, while the bias of the spring is applied to its other end to the effect that the end of the lever arm supported against the face urges the coupling element into engagement with the associated second coupling element.

As an alternative to the above configuration of stepping drives with globoid wheel or cylindrical wheel, the configuration can also be such that the safety coupling disposed between the globoid or cylindrical roller and the drive shaft has two coupling elements which are displaceable relative to one another and are in positive engagement with one another or disengaged from one another according to their position. One of the coupling elements is coupled co-rotationally with the drive shaft and the other co-rotationally with the globoid or cylindrical wheel mounted rotatably on the drive shaft. One end of the biasing spring is supported directly or indirectly on the coupling element that is displaceable relative to the other coupling element. The coupling elements are urged into engagement, and the biasing elemen supporting the other end of the spring is disposed on one end of a lever journaled in the drive casing which is coupled with a follower sensing the control surface of the cam. In this embodiment, therefore, the position of the coupling elements and drive cam are exchanged as regards their association with the drive shaft and output shaft, respectively.

At the same time the globoid or cylindrical roller and the coupling element co-rotationally connected with it can then be combined to form an integral component mounted for rotation but longiudinally unddisplaceably on the drive shaft, the associated second coupling element joined co-rotationally to the drive shaft being then disposed on the drive shaft for displacement longitudinally.

In accordance with the exchanged arrangement of the coupling elements and cam mechanism in this drive, the configuration of the special embodiment is then made such that the lever is a one-arm lever which is journaled at its one end on a shaft runing parallel to the drive shaft in the area between the drive shaft and output shaft and which extends beyond the cam-drive cam provided on or beside the driven wheel and joined co-rotationally therewith, and is provided in its area opposite the drive cam with the follower tracking the drive cam. The bias of the spring is applied to its free end in such a direction that the follower is urged into contact with the drive cam. On the shaft bearing the lever a second, two-arm lever is journaled whose one arm is supported on the free end face of the coupling element mounted for co-rotation but longitudinally displaceably on the drive shaft, while the bias of the spring is applied to its other end such that the lever arm end supported on the end face of the coupling element urges the coupling element into engagement with the associated second coupling element.

The arrangement of the bias spring on the free ends of the lever or on the free arm of the two-arm lever is best made such that on the free end of the lever one end of a pull rodd passed longitudinally displaceably through a bore in a component provided on the free end of the associated arm of the two-arm lever is pivotally linked, and that the bias spring is a compression spring disposed under bias on the section of the pull rod passed through the bore.

To set the bias it is then recommendable that the compression spring thrust at its end remote from the associated arm of the two-arm lever against a nut screwed onto a thread on the free end of the pull rod. By varying the depth to whichc this nut (best locked by a second nut) is turned, the bias is then variable. In operation, the movement of the lever derived from the cam of the cam drive is then superimposed, of course, on the present bias.

The invention will be further explained in the description of an embodiment that follows, in conjunction with the drawing, wherein:

FIG. 3 is a view of the drive seen in the direction of the arrow 3 in FIG. 2, wherein the cover that normally closes the drive casing in the viewing direction is not represented.

Figure 1:
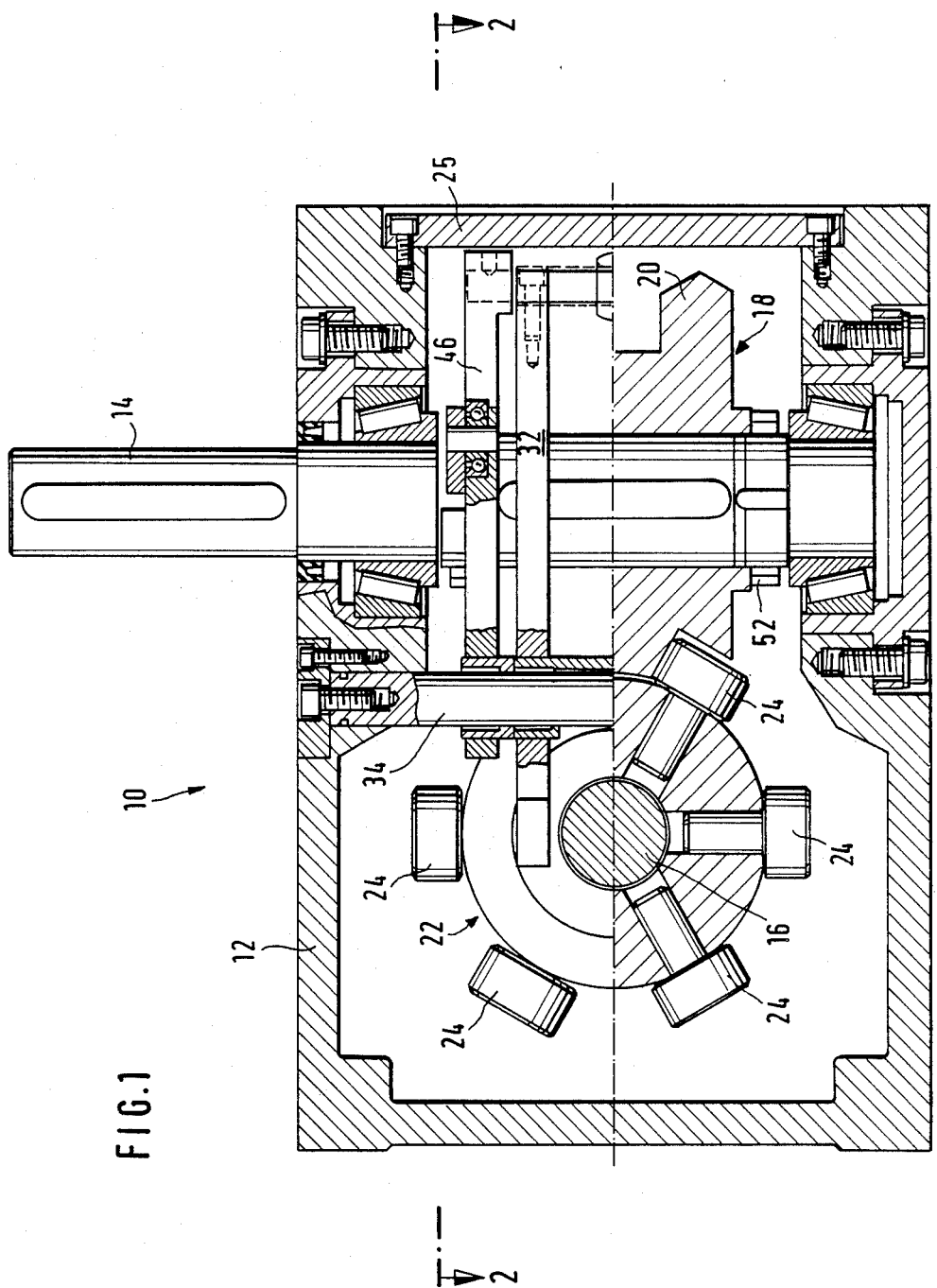
FIG. 1 is a view of a globoid stepping drive represented partially in a longitudinal central section and partially in sectional planes offset therefrom, and having an overload coupling controlled in the manner of the invention in regard to the disengagement torque.

The globoid stepping drive shown in the figures and identified as a whole by 10 has a casing 12 in which a drive shaft 14 having one end extending out of the casing is journaled, and an output shaft 16 whose one end also extends out of the casing offset from the drive shaft and at right angles thereto. On the drive shaft 14 there is disposed for co-rotation therewith a globoid wheel 18 having an approximately trapezoidal cam lobe 20 projecting from its circumference, and the output shaft 16 bears an output wheel 22 from whose circumference cam follower pins 24 project radially at uniform angular intervals, of which the two cam follower pins 24 pointing toward the globoid wheel 18 engage the lateral flanks of the cam lobe 20. Upon a rotation of the drive shaft 14 by an electric motor, for example, flange-mounted on its end projecting from the drive casing, the globoid wheel 18 is set in rotation and its rotation is transmitted by the cam lobe 20 to the cam follower pins 24 which engage it, the shape of the cam lobe 20 of the globoid wheel 18 determining the law of motion, i.e., the rotatory speed and acceleration of the output wheel 22 and thus of the output shaft 16 produced in each case. Thus it is possible to convert the constant input speed of the motor (not shown) to a constant output rotation, the shape of the cam lobe in stepping drives of the kind represented being often selected such that the output wheel 22, starting from a motionless period, performs an initially accelerated and then constant-velocity rotatory movement and then again slows to a stop. To the extent thus far described, the globoid stepping drive corresponds to known drives of this kind, so that any further description of the manner of mounting the drive shaft and output shaft in the casing and the special configuration of the cam followers disposed on the output wheel, in the form of rollers running on the flanks of the cam lobe of the globoid wheel, can be dispensed with. It will only be mentioned also that the drive casing 12 is open on its side facing the globoid wheel 18, but the opening is, of course, closed with a cover 25 that is bolted on.

Figure 2:
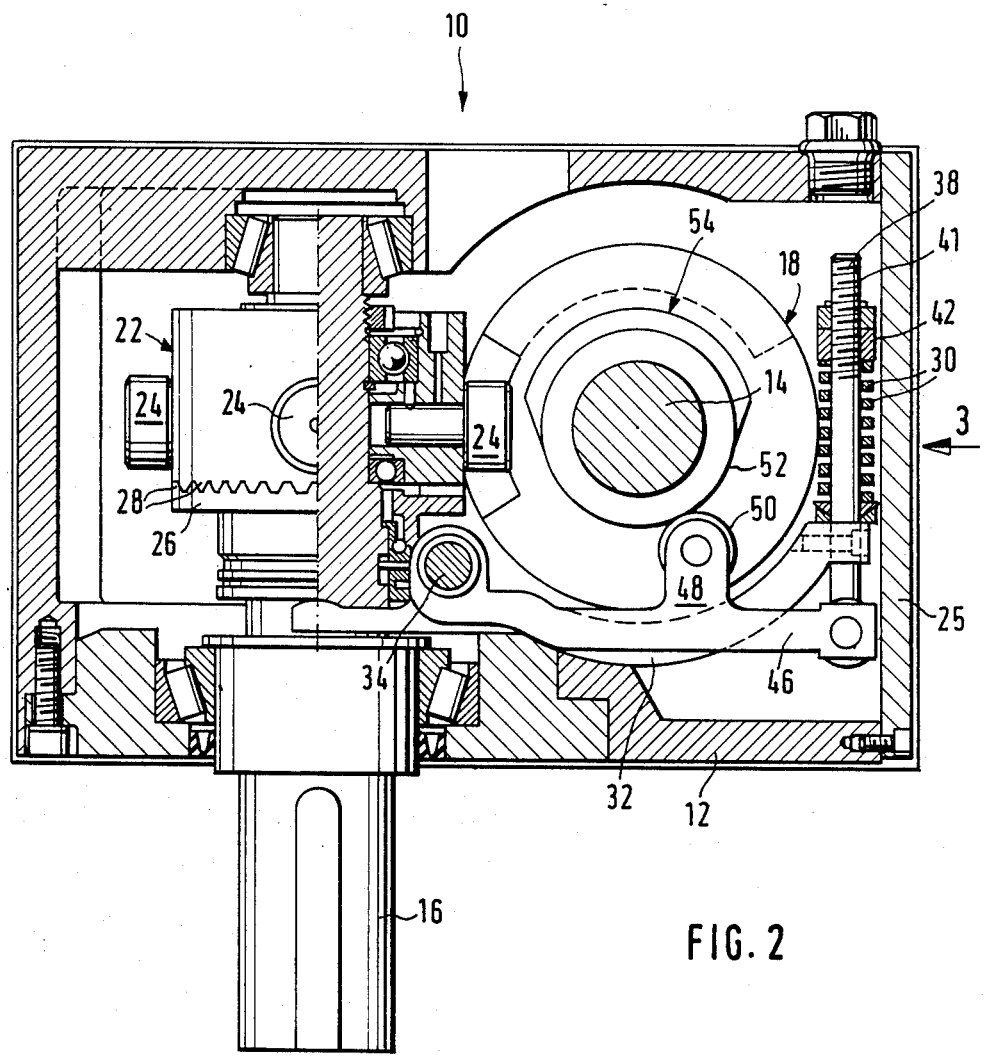
FIG. 2 is a sectional view seen in the direction of the arrows 2—2 in FIG. 1, the driven wheel and the output shaft being represented half-sectioned inside of the drive casing.

The safety coupling in the illustrated case is disposed on the output shaft 16, while, as it can be seen in FIG. 2, the output wheel 22 which is mounted for rotation but not for longitudinal displacement on the output shaft 16 itself forms one of the coupling elements of the safety coupling. The second coupling element 26 is formed by a discoidal component mounted for co-rotation but to a given extent for longitudinal displacement on the output shaft and having a diameter corresponding to the diameter of the output wheel 22. In the confronting end faces the output wheel 22 and the discoidal component have complementary serrations with radial teeth 28 whose flanks are inclined such that, in the transmission of a turning force from the output wheel 22 to the second coupling element 26 formed by the discoidal component, a component of force develops which acts in the axial direction between the teeth and which pushes the second coupling element 26 out of meshing engagement with the output wheel 22 unless a correspondingly greater opposite axial force is applied to the second coupling element. This counterforce is produced by a biased spring 30 which can be seen especially in FIGS. 2 and 3. This helical spring 30, which is under compressive bias, presses on the one end of an arm of a two-arm lever 32 which is pivoted on a shaft 34 mounted in the drive casing 12 between the drive shaft and the output shaft, parallel to the drive shaft 14, and with the end of its other arm lies against the side of the coupling element that faces away from the serrations. The spring 30 under compressive bias therefore urges the coupling element 26 formed by the discoidal component such that a positive coupling is created through the confronting serrations 28. The disengagement of the safety coupling accordingly will not take place until, with the drive under power, the sum of the axial components of the transmitted turning force developing at the sloping flanks of the serrations is greater than the bias of the spring. The two-arm lever 32, in the case of the embodiment shown in the drawing, is otherwise in the form of a double two-arm lever disposed symmetrically with the longitudinal central plane on both sides of the drive, the ends of the two individual levers being yoked together at the spring end by a crosspiece 36 on which the spring 30 is supported.

The spring 30 is held on a pull rod 38 which extends in a longitudinally displaceable manner through a bore 40 in the crosspiece 36 and is provided at the spring end with a screw thread 41 on which a nut 42 is threaded and suitably locked by a jam nut or in some other manner. On the opposite end the pull rod 38 is linked pivotingly to a cross shaf 44 which in turn is disposed on the free end of a one-arm lever 46 which in turn is formed by two levers provided symmetrically one on each side of the longitudinally central axis of the drive and yoked together by the cross shaft 44. The lever 46 is fulcrumed on the shaft 34 on which the two-arm lever 32 is also fulcrumed. The individual levers of the pair 46 joined together by the cross shaft 44 are each carried laterally directly beside the faces of othe globoid wheel 18 and have each in a middle portion a projection 48 extending toward the drive shaft, and on the free end of each is journaled a roller 50, each roller 50 running on the face of the cam 54 formed on the associated face of the globoid wheel 18. The projection 48 and the roller 50 thus form the follower of a cam drive which, when the drive is running and the drive cam 54 is ithus rotating, results in an oscillatory movement of the lever 46. It can be seen that, with this movement of the lever 46, the bias in the spring 30 also changes, which results in a corresponding change in the force exerted on the second coupling element formed by the discoidal component. Accordingly, the disengagement torque of the safety coupling varies according to the shape of the surface 52 of the drive cam 54. By the appropriate configuration of the cam surface 52, therefore, desired disengagement characteristics can be established for the safety coupling.

It is apparent that modifications and improvements of the embodiment described above can be achieved within the scope of the concept of the invention. It is conceivable, for example, that the safety coupling disposed on the output shaft in the drive described could be provided on the drive shaft, in which case the position of the lever 46 and of the two-arm lever 32 in the drive casing changes to the effect that the bias of spring 30 is then controlled by a drive cam provided on the output wheel. Furthermore, it is to be noted that the described configuration and arrangement of the safety coupling is not restricted to globoid stepping drives, but that it can also be applied to other mechanical drives---for example stepping drives having a cylindrical wheel instead of a globoid wheel or even in the case of worm drives. Instead of the special safety coupling having coupling elements which can be positively coupleld by tooth-like serrations, safety couplings of other kinds can be used if appropriately adapted, provided that their disengagement force or their disengagement torque depends on the bias of a spring, which can be varied by a cam drive in the manner described.

I claim:
1. A stepping drive having a first rotatable member adapted to be driven by a drive shaft, a second rotatable member adapted to drive a driven sahft, said first and second rotatable members engaging each other for transforming a continuous rotation of said first rotatable member into an intermittent rotation of said second rotatablel member, one of said rotatable members being connected to its associated shaft by coupling means, a retaining member being arranged to exert a retaining force onto said coupling means to keep the same in an engaged condition, and control means associated with one of said shafts, said control means establishing a predetermined relationship between said retaining force and the angular position of said one shaft.

2. A stepping drive according to claim 1, wherein the first rotatable member is a wheel disposed in a drive casing and having a circumferential surface in which a drive cam is provided, with which mesh outdrive control pins projecting radially at uniform intervals from the circumferential surface of said second rotatable member, said second rotatable member being disposed on the driven shaft which is journaled in the drive casing at right angles to and at a distance from the drive shaft, said coupling means being disposed between the second rotatable member and the driven shaft and having first and second coupling elements displaceable relative to one another from a position in which they are in positive engagement with one another to a position in which they are disengaged from one another, said first coupling element being coupled co-rotationally with the second rotatable member which in turn is borne on the driven shaft, and the second coupling element being coupled co-rotationally with the driven shaft, one end of a biasing spring being supported on the second coupling element, the coupling elements being urged into engagement, and a biasing element thrusting against the other end of the spring, said biasing element being connected to one end of a lever pivotally mounted in the drive casing, said lever being coupled with a cam follower tracking a control surface of the cam of the cam drive forming said control means.

3. A stepping drive according to claim 2, wherein the second rotatable member and the first coupling element coupled co-rotationally therewith are combined into an integral component which is rotatable but non-displaceable lengthwise on the driven shaft, the second coupling element being disposed for longitudinal displacement on the driven shaft.

4. A stepping drive according to claim 3, wherein the lever is a one-arm lever having one end journaled in the drive casing on a further shaft running parallel to the drive shaft between the drive shaft and the driven shaft, said lever extending beyond the drive cam and the cam follower being opposite the drive cam, the bias of the spring being applied to the free end of the lever such that the follower is urged into engagement with the control surface, a two-arm lever being journaled on the further shaft, one arm of said two-arm lever being supported on a free face of the second coupling element, the bias of the spring being applied to the other arm of the twoarm lever such that the one arm urges the second coupling element into engagement with the first coupling element.

5. A stepping drive according to claim 1, wherein the first rotatable member is a wheel disposed on the drive shaft in a drive casing and having a circumferential surface in which a drive control cam is provided with which mesh output drive pins projecting at regular intervals radially from the circumference of said second rotatable member, said second rotatable member being disposed on the driven shaft mounted in the drive casing at right angles to and at a distance from the drive shaft, said coupling means being disposed between the wheel and the drive shaft and having two coupling elements displaceable relative to one another and in positive engagement with one another in one position and disengaged from one anaother in another position, one of said coupling elements being coupled co-rotationally with the drive shaft and the other coupling element being coupled corotationally with the wheel journaled on the drive shaft; one endd of a biasing spring being supported on the other coupling element, the coupling elements being urged into engagement, a biasing element supporting the other end of the spring and being connected to one end of a lever pivotally mounted in the drive casing, said lever being coupled with a cam follower tracking a control surface of the cam forming said control means.

6. A stepping drive according to claim 5, wherein the wheel and the coupling element co-rotationally connected therewith are combined to form an integral component mounted rotatably but longitudinally non-displaceably on the drive shaft, the other coupling element joined co-rotationally to the drive shaft being disposed on the driven shaft for displacement longitudinally thereof.

7. A stepping drive according to claim 6, wherein the lever is a one-arm lever having one end journaled on a shaft running parallel to the drive shaft between the drive shaft and the driven shaft, and extends beyond the cam, and is provided opposite the drive cam with the cam follower, the bias of the spring being applied to the free end of the lever insuch a direction that the cam follower is urged into contact with the control surface, a two-arm lever being journaled on the shaft bearing the lever, the said two-arm lever having one arm supported on the free end face of the coupling element mounted for co-rotation but longitudinally displaceably on the drive shaft, while the bias of the spring is applied to the other arm such that the one lever arm urges the one coupling element into engagement with the other couupling element.

8. A stepping drive according to claim 4 or 7 wherein on the free end of the one-arm lever there is linked one end of a pull rod passed longitudinally displaceably through a bore in a component provided on the free end of an associated arm of the two-arm lever, the bias spring being a compression spring disposed under bias on the one end of the pull rod passed through the bore.

9. A stepping drive according to claim 8, wherein the compression spring thrusts at an end remote from the associated arm of the two-arm lever, against a nut screwed onto a thread on the free end of the pull rod.

* * * * *